United States Patent [19]
Sorensen

[11] Patent Number: 5,176,284
[45] Date of Patent: Jan. 5, 1993

[54] REDUCTION OF FLEXURE IN A PLASTIC CONTAINER HAVING A THIN FLEXIBLE SIDE WALL

[75] Inventor: Jens O. Sorensen, Rancho Santa Fe, Calif.

[73] Assignee: Primtec, Rancho Santa Fe, Calif.

[21] Appl. No.: 610,510

[22] Filed: Nov. 8, 1990

[51] Int. Cl.⁵ .......................................... B65D 25/00
[52] U.S. Cl. .................................. 220/659; 220/671; 220/675; 206/505; 206/519
[58] Field of Search ............... 220/639, 643, 644, 645, 220/656, 657, 659, 669, 670, 671, 673, 675, 306, 307, 359; 206/505, 519

[56] References Cited

U.S. PATENT DOCUMENTS

| | | | |
|---|---|---|---|
| 2,765,832 | 10/1956 | Tupper | 220/659 X |
| 3,648,884 | 3/1972 | Mansolino | 220/669 |
| 3,670,922 | 6/1972 | Phillips | 206/519 |
| 3,836,042 | 9/1974 | Petitto | 206/519 |
| 3,907,156 | 9/1975 | Weatherhead, III | 220/307 |
| 3,915,330 | 10/1975 | Hammes et al. | 220/659 |
| 3,934,747 | 1/1976 | Needt | 220/675 X |
| 4,048,766 | 9/1977 | Dantzer et al. | 220/659 X |
| 4,195,746 | 4/1980 | Cottrell | 220/675 X |
| 4,375,862 | 3/1983 | Kurinsky et al. | 220/293 |
| 4,452,382 | 6/1984 | Von Holdt | 222/529 |
| 4,491,238 | 1/1985 | Tobolt | 220/307 |
| 4,616,762 | 10/1986 | Alexander | 220/669 X |
| 4,667,842 | 5/1987 | Collins | 220/307 |
| 4,682,707 | 7/1987 | Wiles | 220/307 |
| 4,848,580 | 7/1989 | Wise | 206/519 |
| 4,925,049 | 5/1990 | Przytulla | 220/675 |
| 4,967,908 | 11/1990 | Kessler | 206/518 |
| 5,042,674 | 8/1991 | Ramsay et al. | 220/4.24 |

FOREIGN PATENT DOCUMENTS 2118841 5/1973 Fed. Rep. of Germany.

*Primary Examiner*—Allan N. Shoap
*Assistant Examiner*—Stephen K. Cronin
*Attorney, Agent, or Firm*—Edward W. Callan

[57] ABSTRACT

In a plastic container, including a base and a thin flexible perimetric side wall extending from the base and terminating in a perimetric rim, the side wall includes a perimetric ledge extending generally in a lateral direction; an upper perimetric wall section extending between an outer edge of the ledge and the rim; a lower perimetric wall section extending toward the base from an inner edge of the ledge; and a perimetric series of longitudinal ribs closely spaced about all of the ledge and extending between the ledge and one of said wall sections for reinforcing the container against extreme flexure when the container is lifted by being gripped at the upper wall section by a thumb and finger while the container contains a substantial weight of material. The ribs are recessed from a brink of the ledge and have an exposed edge that extends between the ledge and the one wall section at an angle that is less than an angle between the ledge and the one wall section. The ribs are spaced so that there are at least three ribs within each inch of the ledge.

2 Claims, 1 Drawing Sheet

REDUCTION OF FLEXURE IN A PLASTIC CONTAINER HAVING A THIN FLEXIBLE SIDE WALL

BACKGROUND OF THE INVENTION

The present invention generally pertains to thin-wall plastic containers and is particularly directed to reducing the flexure of such a container that occurs when the container is lifted by being gripped at an upper side wall section adjacent the rim by a thumb and finger while the container contains a substantial weight of material.

In some containers, such as flower pots, the upper side wall section adjacent the rim by which the container is gripped is joined with a tapered lower side wall section by a perimetric ledge that extends in a generally lateral direction, with the upper side wall section extending from an outer edge of the ledge and the lower perimetric wall section extending inward toward the base from an inner edge of the ledge. Typically the container is lifted by gripping the upper section of the side wall with the thumb inside the container and the index finger outside the container beneath and supported by the ledge.

When the side wall of such a container is made of thin flexible plastic material the interior volume of the container is extremely distorted as a result of flexure of the side wall when the container is lifted by being gripped at the upper wall section by a thumb and finger while the container contains a substantial weight of material.

SUMMARY OF THE INVENTION

The present invention reduces the flexure of the thin flexible plastic side wall of the container when the container is lifted by being gripped at an upper side wall section adjacent the rim by a thumb and finger while the container contains a substantial weight of material.

The plastic container of the present invention includes a base and a thin flexible perimetric side wall extending from the base and terminating in a perimetric rim; wherein the side wall includes a perimetric ledge extending generally in a lateral direction; an upper perimetric wall section extending between an outer edge of the ledge and the rim; a lower tapered perimetric wall section extending inward toward the base from an inner edge of the ledge; and a first perimetric series of longitudinal ribs spaced about all of the ledge and extending between to interconnect the ledge and the upper wall section for reinforcing the container against extreme flexure when the container is lifted by being gripped at the upper wall section by a thumb and a finger while the container contains a substantial weight of material; and a second perimetric series of longitudinal ribs spaced about all of the ledge and extending between to interconnect the ledge and the lower perimetric wall section for further reinforcing the container against extreme flexure when the container is lifted by being gripped at the upper wall section by a thumb and a finger while the container contains a substantial weight of material.

The ribs are spaced so that there are at least three said ribs within each inch (2.5 cm) of the ledge. Such spacing of the ribs distributes the weight so that the pressure applied by an individual rib against the thumb and fingers is not of such a magnitude as to injure the thumb and fingers by wear as a result of extended frequent lifting of many such containers.

Additional features of the present invention are described with reference to the description of the preferred embodiment.

DESCRIPTION OF THE PREFERRED EMBODIMENT

Figure 1:
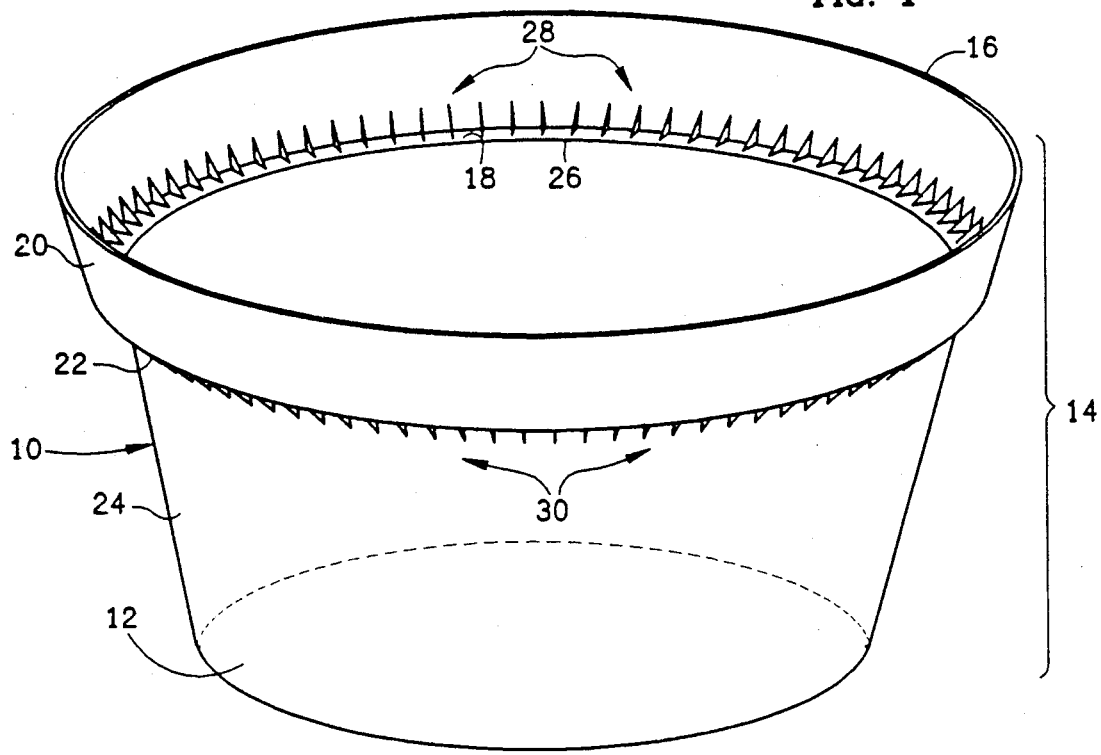
FIG. 1 is a perspective view of a preferred embodiment of a thin-wall plastic container according to the present invention.

Referring to FIG. 1, a preferred embodiment of a thin-wall plastic container 10 according to the present invention includes a base 12 and a a thin flexible perimetric side wall 14 extending from the base 12 and terminating in a perimetric rim 16.

Figure 2:
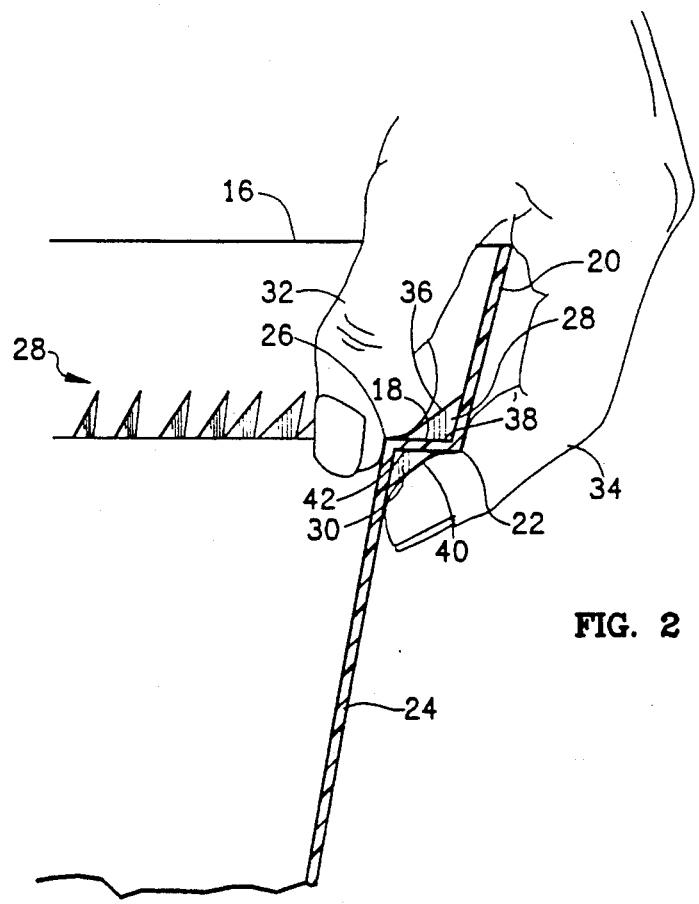
FIG. 2 is a cut-away view of a portion of the container of FIG. 1 illustrating the upper side wall section of the container being gripped between a thumb and an index finger.

The side wall 14 includes a perimetric ledge 18 extending generally in a lateral direction, an upper perimetric wall section 20 extending between an outer edge 22 of the ledge 18 and the rim 16, a tapered lower perimetric wall section 24 extending toward the base 12 from an inner edge 26 of the ledge, and two perimetric series of longitudinal ribs 28, 30 closely spaced about all of the ledge 18 and extending between the ledge 18 and the respective upper and lower wall sections 20, 24 for reinforcing the container 10 against extreme flexure when the container 10 is lifted by being gripped at the upper wall section 20 by a thumb 32 and a finger 34, as shown in FIG. 2, while the container 10 contains a substantial weight of material.

A first series of ribs 28 have an exposed edge 36 that extends between one side 38 of the ledge 18 and the upper wall section 20 at an angle that is less than an angle between the ledge 18 and the upper wall section 20. The angle of extension of the exposed rib edges 36 is approximately forty-five degrees.

To further reduce contact between the rib edges 36 and the thumb 32 of a person gripping the container, the ribs 28 are recessed from a brink defined by the inner edge 26 of the ledge 18.

A second series of ribs 30 have an exposed edge 40 that extends between the other side 42 of the ledge 18 and the lower wall section 24 at an angle that is less than an angle between the ledge 18 and the lower wall section 24. The angle of extension of the exposed rib edges 40 is approximately forty-five degrees.

To further reduce contact between the rib edges 40 and the finger 34 of a person gripping the container, the ribs 30 are recessed from a brink defined by the outer edge 22 of the ledge 18.

The optimum spacing of adjacent ribs in each series of ribs 28, 30 may vary in accordance with the thickness of the side wall 14. For a side wall 14 having a thickness of approximately 0.010 inches (0.25 mm), the spacing of the ribs in each series of ribs 28, 30 is approximately six ribs per inch.

In addition to flower pots, the thin-wall flexible plastic container of the present invention may be utilized for containing many varieties of objects, such as produce, for example.

I claim:
1. A plastic container, comprising
a base; and a thin flexible perimetric side wall extending from the base and terminating in a perimetric rim;

wherein the side wall includes
- a perimetric ledge extending generally in a lateral direction;
- an upper perimetric wall section extending between an outer edge of the ledge and the rim;
- a lower tapered perimetric wall section extending inward toward the base from an inner edge of the ledge; and
- a first perimetric series of longitudinal ribs spaced about all of the ledge and extending between to interconnect the ledge and the upper perimetric wall section for reinforcing the container against extreme flexure when the container is lifted by being gripped at the upper wall section by a thumb and a finger while the container contains a substantial weight of material;
- a second perimetric series of longitudinal ribs spaced about all of the ledge and extending between to interconnect the ledge and the lower perimetric wall section for further reinforcing the container against extreme flexure when the container is lifted by being gripped at the upper wall section by a thumb and a finger while the container contains a substantial weight of material.

2. A plastic container, according to claim 1, wherein the ribs are spaced so that there are at least three said ribs within each inch of the ledge.

* * * * *